INVENTORS.
Lloyd E. Lefevre
John R. Frost

INVENTORS.
Lloyd E. Lefevre
John R. Frost
BY
AGENT 3,565,737
COMPOSITE PLASTIC SHEET AND METHOD FOR
THE PREPARATION THEREOF
Lloyd E. Lefevre, Bay City, and John R. Frost, Midland, Mich., assignors to The Dow Chemical Company, Midland, Mich., a corporation of Delaware
Filed Nov. 26, 1965, Ser. No. 509,731
Int. Cl. B32b 3/14
U.S. Cl. 161—36
12 Claims

ABSTRACT OF THE DISCLOSURE

Packaging film having controlled cling is prepared by simultaneously extruding a stream which forms the major body of the film and incorporating therein minor portions of a different thermoplastic material in such a way that the minor portions are selectively disposed adjacent at least one surface of the film.

---

This invention relates to composite plastic sheets and a method for the preparation thereof and more particularly relates to the preparation of a thin plastic sheet which has incorporated therein an adhesive or adhering material.

Oftentimes in the preparation of packages and overwraps it is necessary to join a plastic film or sheet to itself by means of heat sealing or adhesives. Frequently it is desirable that a synthetic thermoplastic resinous material have the property of cling, that is one or both of the major surfaces of such a film or sheet show a marked tendency to adhere to other surfaces or to itself. In many cases where packages and the like are prepared, an adhesive strip, often of the pressure sensitive variety, is incorporated on the surface of the formed film and the film subsequently fabricated into a desired overwrap. Due to the presence of an adhesive layer, on the surface of the film, the thickness of the film will vary and the treated film cannot be conveniently wound onto supply rolls for storage or transportation. Winding such a material onto a roll frequently causes undesired distortion of the roll and subsequent deformation of the rolled material to such an extent that if lay-flat film is initially employed, it is no longer lay-flat after a period of time on the roll.

It would be desirable if there were available an improved synthetic thermoplastic resinous film of generally constant thickness which exhibited adhesive or adherent characteristics in selected regions thereof.

Furthermore it would be advantageous if there were a method for the preparation of such film wherein the film is quickly and easily prepared.

It would be further advantageous if such a method would permit the disposition of an adhesive or adhering element either on or in the film and provide a sheet having a generally constant thickness.

These benefits and other advantages, in accordance with the present invention, are achieved in a synthetic resinous thermoplastic sheet or film having a first and second surface, a portion of an adhering substance embedded within the film, the adhering substance having adhesion characteristics substantially greater than the film itself, the adhering substance defining at least one surface generally coplanar with at least one of the major surfaces of the film or sheet.

Such a film is readily prepared by heat plastifying a synthetic resinous organic material which is extrudable, passing the heat plastified synthetic resinous material into a configuration, forming the extrudable material into a film-like configuration and, subsequently, discharging the heat plastified stream in the form of a film and cooling the film below its heat plastifying temperature, the improvement which comprises including within the film a separate phase of a material having adhesion characteristics substantially greater than that of thermoplastic resinous material employed to form the film, the adherent material being disposed within the film in such a manner that a portion of the material is disposed on the surface of the film and is generally coplanar with the surface of the film.

Further features and other advantages of the present invention will become more apparent from the following specification when taken in connection with the drawing wherein.

Figure 1:
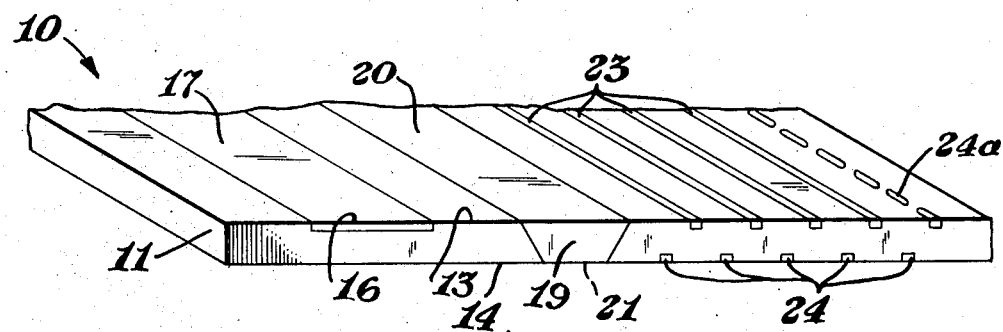
FIG. 1 is a schematic representation of an end view of a portion of film, in accordance with the invention.

In FIG. 1 there is illustrated an end view of a film, in accordance with the persent invention, generally designated by the reference numeral 10. The film 10 is a composite sheet comprising a first body portion, comprising a film body 11, having a first major surface 13 and a second major surface 14. The surfaces 13 and 14 are generally planar and parallel. A layer of an adherent plastic material 16 is disposed within the film body 11 and consists of a narrow elongate strip having a surface 17 which is substantially coplanar with the surface 13 and serves to define a portion thereof. An insert 19 is disposed within the film body 11. The insert 19 and the strip 16 are prepared from a material which has adherent properties greater than the adherent properties of the film body 11. The insert 19 has an upper surface 20 and a lower surface 21 each being generally coplanar with the surface 13 and 14, respectively, of the film 10. A plurality of narrow parallel closely spaced strips 23, of an adherent material, are disposed within the surface 13 of the film 10. Each of the strips 23 is disposed adjacent the surface and a portion of the strips forms a portion of the surface 13. A generally similar set of strips designated by the reference numerals 24 are disposed in the surface 14 of the film 10. A discontinuous strip 24a is formed of a plurality separated inclusions of adherent material. The film 10 is prepared from materials which exhibit greater or lesser degrees of adhesion, for example the material from which the film 10 is prepared beneficially may be a material which does not exhibit cling, tack or the characteristic of adherence, whereas the strip 16, the section 19 and the strips 23 and 24 may be of a relatively tacky material such as a diverse synthetic resinous material, an uncured rubber or other pressure sensitive adhesive materials. Thus, the portions of the film 10, having adhesive elements incorporated within their surface adhere to other materials within the regions where the adhesive elements form a portion of the surfaces 13 and 14.

Figure 2:
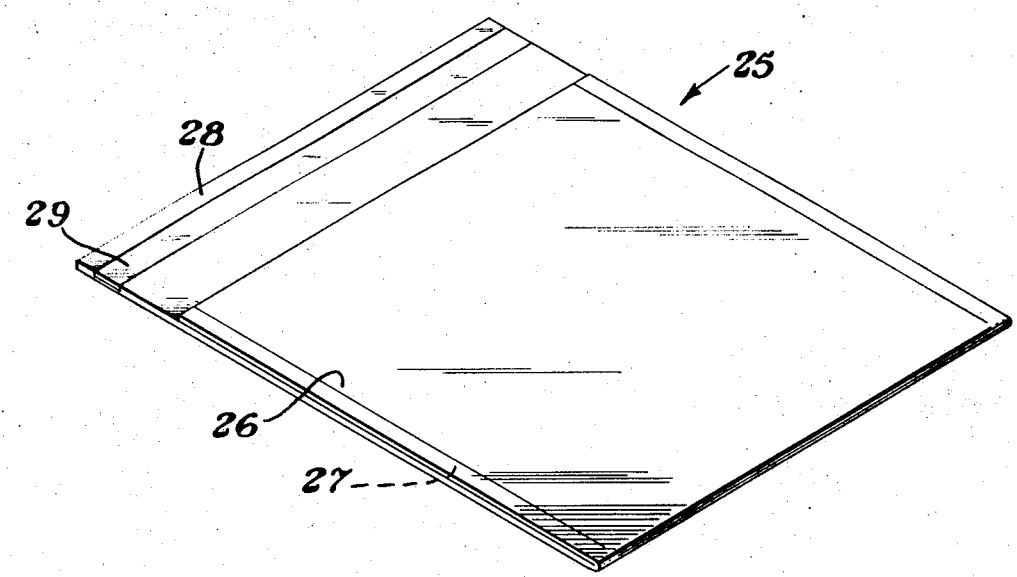
FIG. 2 is a schematic representation of an envelope prepared from film, prepared by the method of the invention.

In FIG. 2 there is depicted a pouch generally designated by the reference numeral 25. The pouch 25 is formed from a single portion of the film having a front portion or flap 26, a rear body portion 27, the rear body 27 having a flap portion 28, the flap portion 28 having an adhesive strip 29 disposed in the surface thereof generally adjacent the portion 26. Advantageously, the strip 29 possesses adhesive characteristics different and greater than the material from which the major portion of the pouch is formed. Thus, unfolding the flap 28 into a closed position, the adhesive strip 29 contacts a portion 26 of the pouch 25 and adheres thereto. Beneficially the degree of adhesion is controlled by the selection of the particular resinous components employed to form the pouch and the adhesive strip.

Figure 3:
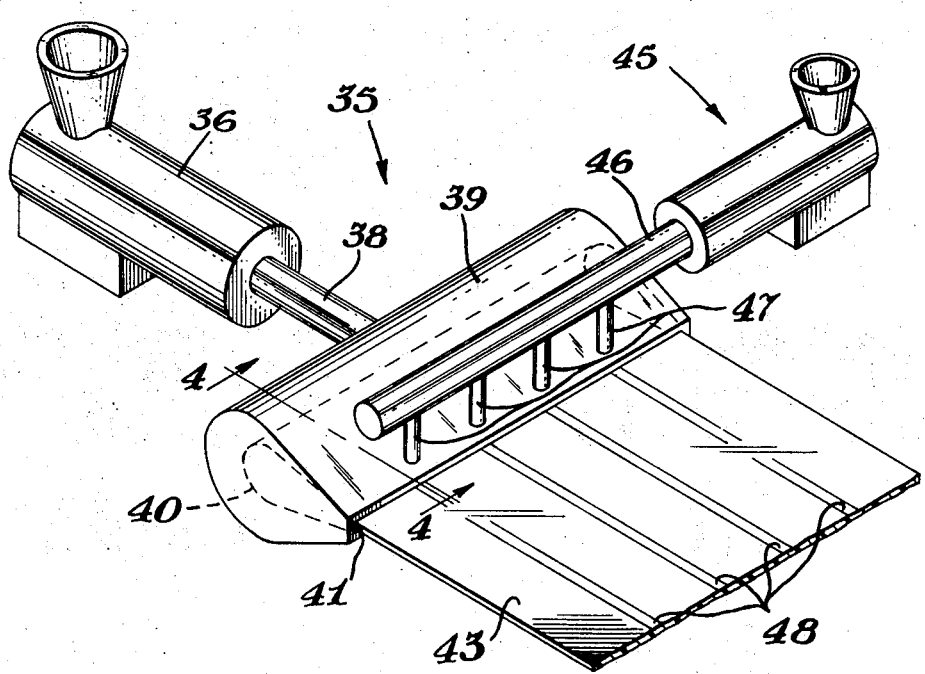
FIG. 3 is a schematic representation of an apparatus suitable to prepare such film.

Composite adhesive element containing film and sheet, in accordance with the present invention, is readily prepared employing apparatus such as is depicted in FIG. 3 and is generally designated by the reference numeral 35. The apparatus of 35 comprises a first extruder 36. The first extruder 36 is adapted to heat plastify a film forming synthetic resinous thermoplastic material. A conduit 38 is in operative communication with the discharge of the extruder 36 and a sheeting die 39 having an internal cavity 40 and an elongate extrusion orifice 41. Material supplied in heat plastified form by the extruder 36 is discharged from the orifice 41 as a film or sheet 43. A second extruder 45, which is adapted to heat plastify and provide a stream of a heat plastified adhesive material, is in operative communication with a header 46. The header or supply means is in operative communication with a plurality of conduits 47 which communicate wtih a portion of the internal cavity 40 and discharge a stream of adhesive material into the cavity generally adjacent the extrusion orifice 41, thereby combining the adhesive material with the heat plastified material from the extruder 36 to provide the composite film 43 having a plurality of adhesive elements 48 disposed therein, each of the adhesive elements being disposed at the surface of the sheet 43.

Figures 4, 5:
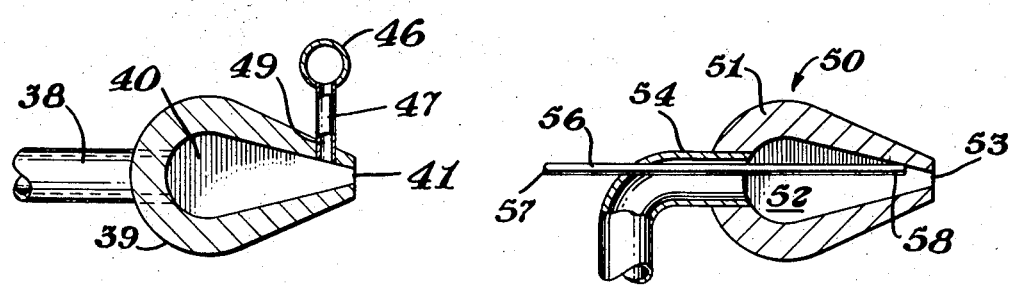
FIG. 4 is a sectional view of the die of FIG. 3 taken along the line 4—4.
FIG. 5 and FIG. 6 depict alternate embodiments of dies suitable for the practice for the method of the invention.

In FIG. 4 there is illustrated a sectional representation of a view of the die 39 of FIG. 3, taken along the line 4—4, wherein a conduit 47 passing into the die body is depicted. Passageways 49 are in operative communication with conduits 47 and terminate within the cavity 40 of the die 39 at a location generally adjacent the extrusion orifice or slot 41.

FIG. 5 depicts an alternate embodiment for the preparation of adhesive element containing sheets, in accordance with the present invention. In FIG. 5 there is illustrated a cross-section of a die 50 generally similar to the die of FIG. 3. The die 50 comprises a die body 51 defining therein a die cavity 52 which is in operative communication with an extrusion orifice 53 also defined by the body 51. A major supply conduit 54 is in operative communication with the die cavity 52 and is adapted to receive heat plastified synthetic resinous material from a source not shown. A distributor tube 56 is disposed within the conduit 54. The distributor tube 56 has an entrance end 57 and a discharge orifice 58 remotely disposed from the entrance end 57. The discharge opening 58 is disposed generally against the die body 51 at a location adjacent the extrusion orifice 53. Extrusion of a film employing a die, in accordance with FIG. 5, results in a major or body portion of the film being formed of material supplied from the conduit 54 to the orifice 52. Adhesive material supplied through the tube 56 is discharged against the internal wall of the cavity 52 and forms an adhesive element in a sheet generally similar to the adhesive elements 16, 23 and 24 of FIG. 1.

Figure 6:
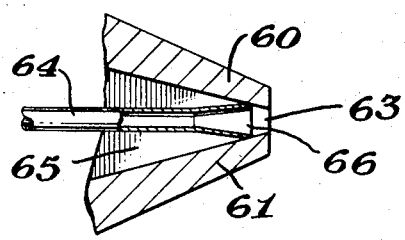

In FIG. 6 there is illustrated a fractional, sectional view of a modification of the embodiment of FIG. 5, wherein there is illustrated a first die lip 60 and a second opposed die lip 61 defining therebetween a slot extrusion orifice 63. An adhesive providing conduit 64 is disposed within a cavity 65 in a die associated with the die lip 60 and 61. The conduit 64 has a terminal or exit opening 66. The conduit 64 makes physical contact with the die lips 60 and 61 to prevent flow of the major film forming material from encapsulating the stream furnished thereby. The arrangement depicted in FIG. 6 is particularly suited and adapted for providing an insert such as the insert 19 of FIG. 1. Depending upon the mechanical design of the die and means of delivery, the adhesive material and the width of the insert may vary widely and indeed may be employed to provide a film having major portions of dissimilar materials.

In the practice of the present invention, a wide variety of synthetic resinous thermoplastic film forming material may be employed including such materials as polyethylene, polypropylene, polyvinyl chloride, polystyrene, extrudable condensation polymers such as the linear polymer obtained from the condensation product hexamethylenediamine and adipic acid, polycaprolactam (Nylon 6), copolymers of vinyl chloride, other monomers such as vinyl acetate, ethyl acrylate and the like, polymethylmethacrylate, polyethylmethacrylate, copolymer of methyl and methylmethacrylate, thermoplastic cellulosic material including cellulose acetate, cellulose propionate, cellulose acetate-butrate, ethyl cellulose, chlorinated polyolefins such as chlorinated polyethylene, chlorinated polypropylene and thermoplastic polymers and copolymers of vinylidene chloride and other mono-olefinically unsaturated monomers copolymerizable therewith. Many such film forming copolymers are well known in the art and are described in the literature.

A wide variety of adhesive elements may be utilized, in the practice of the present invention, and the materials from which they may be prepared include such materials as copolymers of ethylene and vinyl acetate including those containing from about 80 to about 10 weight percent ethylene and from about 20 to about 90 percent vinyl acetate, chlorinated polyethylene, highly plasticized polymers of vinyl chloride containing from about 30 to 60 weight percent of a suitable plasticizer such as tricresyl phosphate, certain copolymers of vinyl and vinylidene chloride which exhibit the characteristic of cling such as a copolymer of about 85 weight percent vinylidene chloride and about 15 weight percent vinyl chloride, uncured natural rubber, a copolymer of 50 percent styrene and 50 percent isobutyl acrylate as well as the substantially solvent free pressure sensitive adhesives. Such adhesives are well known in the art and representative formulations are set forth in the following United States patents: U.S. 2,358,761; U.S. 2,395,419; U.S. 2,744,041; U.S. 2,750,316; U.S. 2,783,166; U.S. 2,156,380; U.S. 2,177,627; U.S. 2,319,959; and U.S. 2,553,816.

Other pressure sensitive adhesives include: a mixture of 100 parts by weight of natural crepe rubber, 100 parts by weight of zinc oxide, 60 parts by weight of hydrogenated resin with 1½ parts by weight of antioxidant which is a condensation of acetone and aniline; a mixture of 100 parts by weight of polyisobutylene having a molecular weight of about 80,000, 100 parts by weight of a polyisobutylene having a molecular weight of about 14,000 and about 40 parts by weight of a soft cumaroneindene resin; a mixture of a copolymer of 40 weight percent styrene and 60 weight percent 2-ethyl-hexylacrylate; a mixture of 50 parts by weight of latex crepe rubber, 50 parts by weight of a copolymer of 75 parts by weight of butadiene and 25 parts by weight of styrene, having a Mooney viscosity of 90, 50 parts by weight of a polyterpene resin having a melting point of about 70° C.; polyisobutyl ether and the like. Many such pressure sensitive adhesives and clinging materials are known to the art.

It is essential and critical to the practice of the present invention that materials forming the composite film have unlike surface characteristics with regard to adhesion and cling.

Beneficially by the process of co-extrusion, using apparatus generally as illustrated in FIG. 3 and hereinbefore described, film of almost any desired configuration and ratio of the adhesive element to the non-adhesive portion can be obtained. It should be noted that the terms adhesive and non-adhesive are relative, for example if high adhesion were rated as 1 and non-adhesion were rated as 10 and various film forming materials classified and assigned a number indicating their adhesion in the range of 1 to 10, a composite film prepared from two materials in a like adhesive classification rating, for example two materials with the rating of 5, does not provide the benefits and advantages of the present invention. It is essential and critical that the adhesive characteristics differ. The particular degree of difference will primarily depend on the use of the composite film and the characteristics desired. For example, a film is readily prepared from a polymer having an arbitrary adhesion rating of 10 and having relatively small areas with an adhesion rating of 1 to provide a non-cling film with highly adhesive areas. At the opposite extreme, it may be desirable to have a slightly adhering film with areas which exhibit higher adhesion characteristics that one might choose depending upon the particular application of material having an adhesion rating of 6 and another material having an adhesion rating of 5. Beneficially in many applications, particularly in most cases where transparent overwrap is desired, it is particularly beneficial to utilize material for both elements of the film which are transparent and in order to maintain the maximum clarity of the overwrap it is oftentimes desirable to maintain the refractive indices of the materials as close as possible in order to eliminate evidence of a weld line between the diverse components of the system. Alternately when attractive and decorative effects are desired, one or both of the elements may be colored or colorless and a high difference of refractive index may be maintained in a case of transparent components if ready indication of the adhesive locations is desired.

Generally, a film in accordance with the present invention is extruded at temperatures suited to the particular components which form the film, and more particularly the temperature is beneficially maintained at a temperature most suited for the major component of the system and the feed rate to the sheeting die being maintained at an optimum condition for the major portion of the resultant film. The minor component which most often is the adhesive or adhering component is fed at a rate and at a temperature just sufficient to provide a film having a generally flat outer surface.

Oftentimes, it is desired that the adhesive area project very slightly above the major surface of the film at a distance, for example, in the region of perhaps $10^{-4}$ of an inch to perhaps $10^{-5}$ of an inch. This is readily accomplished by increasing the temperature and extrusion rate of the component in such a manner that a small quantity of material is provided in excess of that which would provide a flat film. The desired configuration of the minor component in the film is readily attained by employing a suitable die configuration. For example, if it is desired to deposit a thin broad layer such as the layer 16, a slot-like orifice may be employed to inject one component of the extrude into the die. Alternately the stream of minor component is fed to the die such as the die depicted in FIGS. 3 and 4 and the entry point of the stream such as a stream from the passageway 49 is removed farther from the extrusion orifice and closer to the entrance of the conduit 38 thereby permitting spread of the heat plastified stream within the die to form a broad region in the extruded film and a relatively narrow entrance orifice is employed. Generally in order to form strips such as the strips 23 and 24 which are relatively narrow, it is usually desirable to extrude the component forming such strips at a relatively low temperature and form a small orifice situated near the die opening. By intermittently adding the minor component of the film discontinuous strips such as strip 24a of FIG. 1 are obtained. This is readily accomplished by positioning a small reciprocating piston in the supply line adjacent the die.

Selectively adhering film, in accordance with the present invention, is a ready means of providing in roll form materials for the preparation of bags, overwraps, envelopes and the like, and eliminates the need for the additional step of applying an adhesive layer or heat sealing.

By way of further illustration, employing an apparatus utilizing a die generally illustrated in FIG. 5, a composite film is prepared employing polyethylene and a copolymer of 25 parts by weight of vinyl acetate and 75 parts by weight ethylene. The polyethylene is passed into the die orifice, such as the cavity 52 of FIG. 5 and is extruded as a film from the extrusion orifice. The ethylene-vinyl acetate copolymer is extruded adjacent one wall of the die cavity adjacent the die opening from a tubular insert such as the tube 56 of FIG. 5 which terminates in a flat slot about ¼ of an inch wide and about ½ inch from the opening of the die. The composite film is formed into a pouch similar to the pouch illustrated in FIG. 2, wherein the ethylene-vinyl acetate copolymer is disposed on the surface of the flap adapted to contact the pouch body when the flap is in the closed position. The resultant pouch is readily closeable and re-closeable and the portions forming the pouch body itself exhibited no strong tendency to adhere together when the flap is adhered to the body thereof. A generally similar experiment employing the apparatus generally similar to that set forth in FIGS. 3 and 4 wherein high density polyethylene is employed as the main body of the film and the ethylene-vinyl acetate copolymer employed to provide a plurality of strips in the surface of the film having a width of about $\frac{1}{16}$ of an inch spaced on $\frac{1}{16}$ inch centers exhibits significantly higher cling to glass and other surfaces than polyethylene alone.

Film from both of the preceding illustrations are wound onto a mill roll having a 3 inch core and a total diameter of 10 inches is obtained. The resultant mill roll has a cylindrical configuration and does not exhibit any significant distortion in the areas in which the adhesive copolymer is applied.

In a manner similar to the foregoing illustration, beneficial and advantageous film and sheet having areas of selective adhesion are obtained when materials hereinbefore set forth are utilized.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A selectively adhering synthetic resinous film suitable for the preparation of bags, overwraps and the like, the film having a first major surface and a second major surface and a body portion of a first thermoplastic material, a portion of a synthetic resinous thermoplastic adhering substance embedded within the film, the adhering substance having adhesion characteristics substantially different from the body portion, the adhering substance disposed adjacent to and defining an exposed surface, the exposed surface of the adhering substance being generally coplanar with at least one of the major surfaces of the film.

2. The film of claim 1 wherein the adhering substance is disposed in a strip-like manner.

3. The film of claim 1 wherein the adhering substance defines a portion of the first and second surfaces of film.

4. The film of claim 1 wherein the adhering substance defines a plurality of generally parallel elongate strips.

5. The film of claim 1 wherein the film is polyethylene.

6. The film of claim 5 wherein the adhering substance is a copolymer of ethylene and vinyl acetate.

7. A selectively adhering synthetic resinous film suitable for the preparation of bags, overwraps and the like, the film having a first major surface and a second major surface and a body portion of polyethylene, a portion of an ethylene-vinyl acetate copolymer embedded within the film, the copolymer having adhesion characterstics substantially different from the polyethylene, the copolymer disposed adjacent to and defining an exposed surface, the exposed surface of the copolymer being generally coplanar with at least one of the major surfaces of the film.

8. In a method for the preparation of a synthetic resinous selectively adhering film comprising heat plastifying a first synthetic resinous material, passing the first heat plastified synthetic resinous material into a configuration, forming the first heat plastified material into a film-like configuration, subsequently discharging the heat plastified stream of first material in the form of a film having first and second major surfaces and cooling the resultant film below its heat plastifying temperature, the improvement which comprises including within the first heat plastified synthetic resinous material prior to discharging a separate phase of a second synthetic resinous material having adhesion characteristics substantially different from that of the first thermoplastic resinous material employed to form the film, the second material being disposed within the film in such a manner that a portion of the second material forms a surface generally coplanar with the first surface of the film.

9. The method of claim 8, wherein the separate phase is intermittently added to the film forming composition.

10. The method of claim 8 wherein the second material is a synthetic resinous thermoplastic material.

11. The method of claim 10, wherein the adherent material, in a heat-plastified condition, is selectively disposed within the configuration.

12. In a method for the preparation of a synthetic resinous selectively adhering film comprising
heat plastifying polyethylene,
passing the polyethylene into a configuration,
forming the polyethylene into a film-like configuration, subsequently
discharging the heat plastified polyethylene in the form of a film having first and second major surfaces and
cooling the resultant film below its heat plastified temperature, the improvement which comprises
including within the heat plastified polyethylene prior to discharging a separate phase of a copolymer of ethylene vinyl acetate which has adhesion characteristics substantially different from those of the polyethylene employed to form the film, the copolymer being disposed within the film in such a manner that a portion of the copolymer forms a portion of the surface of the film and is generally coplanar with the first surface of the film.

References Cited
UNITED STATES PATENTS

| | | | |
|---|---|---|---|
| 1,469,815 | 10/1923 | Lovesoy | 161—36 |
| 2,407,549 | 9/1946 | Gurwick | 117—98X |
| 3,321,804 | 5/1967 | Breidt et al. | 18—13 |

ROBERT F. BURNETT, Primary Examiner

W. A. POWELL, Assistant Examiner

U.S. Cl. X.R.

18—13; 156—244, 298, 303.1, 500; 161—39, 60, 143, 145, 149; 264—171